May 28, 1940.    L. F. HAHN    2,202,580
APPARATUS FOR FABRICATING FLEXIBLE SHAFTS
Filed July 10, 1937    2 Sheets-Sheet 1

INVENTOR
Lewis F. Hahn

May 28, 1940.  L. F. HAHN  2,202,580
APPARATUS FOR FABRICATING FLEXIBLE SHAFTS
Filed July 10, 1937  2 Sheets-Sheet 2
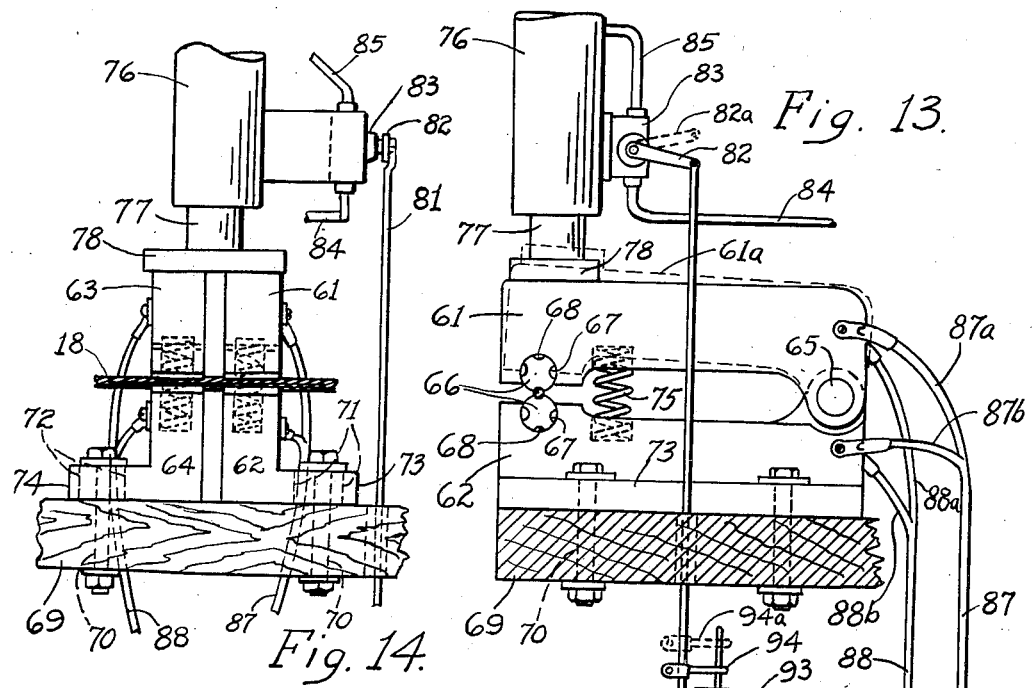
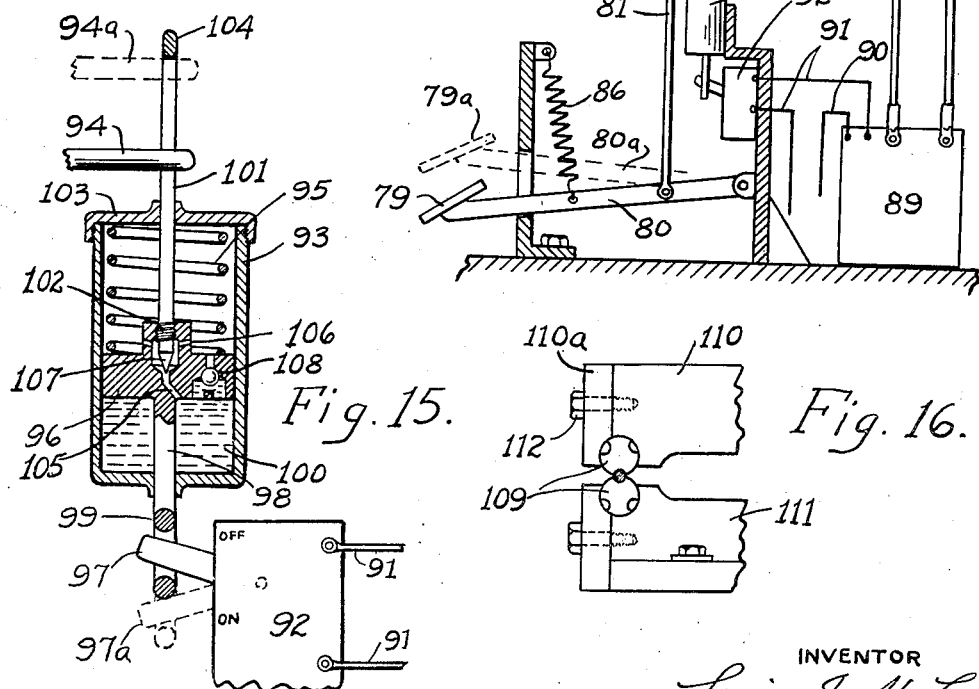
INVENTOR
Lewis F. Hahn Patented May 28, 1940

2,202,580

UNITED STATES PATENT OFFICE 2,202,580

APPARATUS FOR FABRICATING FLEXIBLE SHAFTS

Lewis F. Hahn, Hatboro, Pa.

Application July 10, 1937, Serial No. 152,925

14 Claims. (Cl. 219—1)

This invention relates to flexible shafting, and more particularly to apparatus by which flexible shafting may be severed into relatively short lengths and formed into driving and driven members.

Flexible shafting, as is well known, is formed of concentric layers of multiple strands of wire, adjacent layers being oppositely wound, and the whole forming a shaft of great flexibility and of relatively no rotative elasticity or resilience so as to afford inappreciable relative rotativeness of the shaft ends. Use of the shafting has been minimized in considerable degree by the difficulties encountered in severing the shafting into relatively short lengths. Owing to the resilience of the wire strands used it has been found practically impossible to shear or cut the untreated shafting without having it unwind or unravel at the severed end, to a degree preventing or militating against its use. Many efforts have been made in the past to cope with this unwinding and unraveling factor with varying degrees of success. The shafting has been coated and impregnated with solder and the like, it has been swaged or soldered and then swaged, in an effort to distort the strands and to bend them into anchored relation with each other, it has been covered with a sleeve and then swaged before cutting, and it has even been knit together as by the application of sufficient heat to cause the strands to molecularly adhere, (without losing their strand identity), as a prelude to mechanical cutting, but so far as known there has been more or less dissatisfaction with each of these procedures. The fact that the unravelling or fraying, unstitching, or other form of adhesive separation of one treated shaft end may not occur until after the opposite end of the shaft has been secured to a valuable item of equipment has caused a high waste factor in manufacturing devices utilizing the shafts. Illustratively, the shafts as swaged, for instance, have been attached at one end to a potentiometer in a radio receiving set, for instance, and the very act of securing the device in place on such end, by the use of suitable presses, has caused the other or free end to start to unwind, and as this precludes the use of the unravelled end in its proper place, the entire item assembly of potentiometer and shafting had to be scrapped.

It is among the objects of this invention; to obviate the disadvantages of the prior art; to provide an apparatus for treating shafts so as safely, quickly and economically to sever them into short lengths; to provide a method of severing shafts into short lengths by which the severed ends are comprised of a solid fused block of terminal and comprised of a solid fused block of metal; to provide a flexible shaft having a terminal and comprised of a solid fused block of metal in which all strand identify is lost; to provide means for simultaneously fusing and melting a shaft apart to form two positively secured unravelable ends; and to provide means for forming flexible shafting into a driving shaft.

Other objects of the invention are to provide apparatus incorporating certain automatic phases in the operation of severing the shafting and forming fused ends thereon, and to provide for complete control of the operation of the apparatus in a manner so that the operator may have both hands free to accurately and quickly position the shafting in the apparatus between each cutting operation with consequent increase in rate of production.

Other specific objects of the invention are to provide a readily adjustable electrode for use in the clamping jaws of apparatus of the general type shown in connection with the present invention and also to provide special types of electrodes for particular types of work.

Other objects and advantages will become more apparent as the description proceeds.

In the accompanying drawings:

Fig. 1 represents a diagrammatic side elevation of a cam-operated electrode apparatus for receiving and fusing the flexible shafting between its relatively adjustable jaws, Fig. 2 represents a diagrammatic vertical section through the cooperating jaws of the fusing apparatus in operative position showing a wiring diagram indicating an electrical heating circuit with a fragment of flexible shafting in position and engaged by the electrodes prior to the closing of the fusing circuit, Fig. 3 represents the same as Fig. 2, after the fusing circuit has been closed and indicating the severance of the flexible shafting and the formation of the fused block of metal on the now spaced terminal ends of the fragments of shafting.

Fig. 4 represents a fragmentary enlarged elevation of a portion of the shafting severed according to the invention showing the terminal end formed by the fusion, Fig. 5 represents a transverse section through the main body of the flexible shafting taken on line 5—5 of Fig. 4, and showing the individual strands thereof, Fig. 6 represents a transverse section through the fused terminal end of the shafting taken on line 6—6 of Fig. 4, and showing the complete loss of identity of the strands and their mergence and fusion into a solid integral block of metal.

Figure 9:
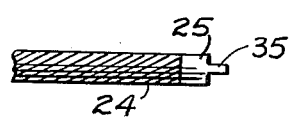
Figure 11:
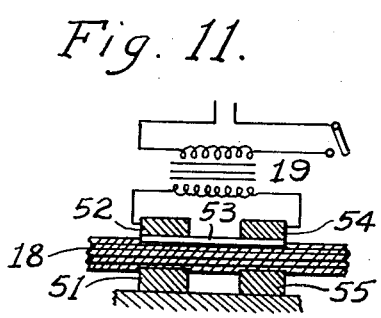
Figure 10:
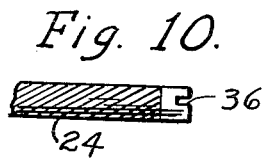
Figure 12:
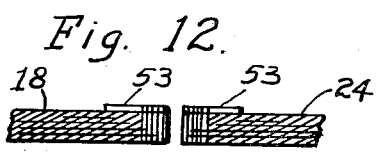

Figs. 9 and 10 represent fragmentary elevations of further modified forms of integral driving terminals, Fig. 11 represents a diagrammatic vertical section through the cooperating jaws of the fusing apparatus in operative position relative to the flexible shafting and to an independent spline or key which is also engaged and held by the jaws prior to the passage of the fusing current, Fig. 12 represents the position of the fragments of the shafting and the previously independent spline after the passage of the current wherein the fusion of the shaft has been accompanied by the fusion of the key which has been both welded in place and also melted apart in the center as shown, Fig. 13 represents a side elevation of another form of apparatus for severing flexible shafting, Fig. 14 represents a front view of a portion of the apparatus of Fig. 13, Fig. 15 represents an enlarged view, partly in section, of the switch control of Fig. 13.

Fig. 16 represents an elevation of an alternative method of retaining the electrodes.

Figure 1:
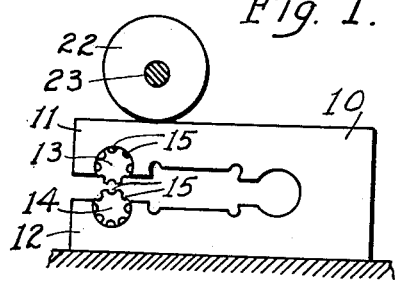

While the details of the particular electrode mounting may vary in accordance with requirements, it is of importance to appreciate that for best results the mounting must be such as to cause flow of current longitudinally of the shafting, in place of merely diametrically thereof. Referring to Fig. 1, there is shown one form of device which may be used in the connection. This comprises a resilient insulated device 10, having opposed upper and lower jaws respectively 11 and 12. The jaws may be formed as desired, but in one desirable form are provided with cooperating opposed rotatable fluted electrode elements 13 and 14, to permit adjustments to take up for wear. The electrode elements may be made of copper or an alloy of copper using, for example, cobalt and beryllium or chromium and beryllium as the alloying materials. With continued use the clamping grooves or flutings 15 become distorted and worn so that they do not furnish proper clamping action and electrical contact with the cable. With my improved form of electrode when this condition develops, ready adjustment to a new pair of clamping grooves is possible by simply rotating the electrodes 13 and 14 in the apertures in jaws 11 and 12. The flutings 15 are so disposed as to embrace and tightly grip a flexible shaft that may be disposed between them.

Figure 2:
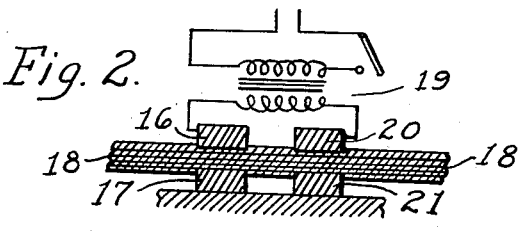

The electrode elements may simply comprise upper and lower jaws as shown in Fig. 2, in which a pair of jaws 16 and 17 are arranged to grip the flexible shaft 18 in slightly spaced relation to the upper and lower jaws 20 and 21 of the other pole of the apparatus. It is of importance that the shaft 18 be rather tightly gripped by the respective pairs of jaws, and for that purpose any suitable means may be used, such for instance as the cam 22, (Fig. 1) which, working on axis 23 is capable of imparting appreciable pressure on the contacts to force the several strands of the cable or shaft into intimate electrical engagement, so that when the circuit is closed (by suitable circuit controller, not shown), current passes from one pair of contacts, as 16—17, to the other pair 20 and 21, longitudinally of the shaft and with all of the strands in electrical engagement so that the current flows through them all. This is the situation in Fig. 2, in which the shafting is in place, pressure has been applied, and the operator is just about to close the circuit between the pairs of electrodes. Obviously, in practice the circuit closing may be automatic in the stop cycle of the cam 22, driven by any suitable source of power, not shown.

Figure 3:
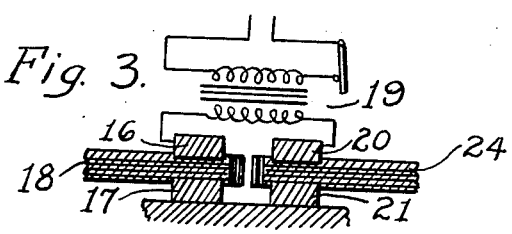

In Fig. 3 the results of passage of the current are manifest. Note that the cable or shaft 18 has now been severed in the center, between electrodes, and a part of its length has been changed into a short shaft 24. Preferably the current is from the low voltage side of a transformer 19, as diagrammatically shown.

Figure 4:
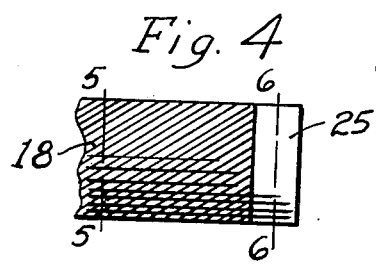

Mention should be made of the fact that the passage of the current through the shaft, longitudinally as shown, forming the shaft disposition shown in Fig. 3, has secured the result by simply raising the temperature of the shaft through its own resistance, to the point not only of fusion, but of such high degree of fusion that it has melted apart in the center, while forming on each of the adjacent spaced terminals, a fused block of solid unstranded metal. As shown in Fig. 4, the end of the shaft is truly a solid block of metal, in which each strand of the shaft is securely anchored, as can be observed by the mergence of the outer or external strand 26, into the metal block 25.

Figures 5, 6:
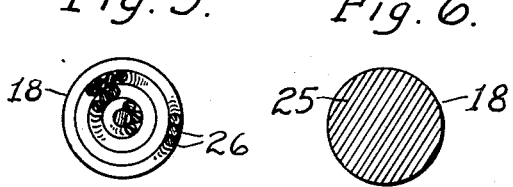

Fig. 5 is a section through the shaft 18, showing the multiple strands and layers, and Fig. 6 is a section through the fused end 25 of Fig. 4, showing the solid integral homogeneous block of metal that was, prior to fusion, a series of independent strands.

It will be recognized that for many purposes the invention so far disclosed is of great value of itself, thus, while noting that the spacing of the jaws in Figs. 2 and 3 is exaggerated somewhat for purposes of illustration, the actual fusion takes place in a smaller space, so that the amount of shaft metal entailed in the fusion itself is a minimum. Moreover, the shafting after severance retains its flexibility practically down to the end, just short of the fused block, whereas, with the prior practice of swaging and then cutting, there was an appreciable length of shaft that was rigid and inflexible for an extent well spaced from the terminal so that it could not have freedom of flexibility of the shafting toward the end as provided when the shaft is treated as in the present invention. Note also that with the strands merged into the solid block of metal, each and every strand is completely and permanently anchored against any unraveling, regardless of the provocation, and is secured in the block with which each strand is integral.

However, important as the foregoing is, it is recognized that the cut lengths of shafting must be provided with means of some sort for rendering it possible to transmit torque through the shaft to an agency to be turned or rotated, to secure the utmost benefits from the shafting. The solid fused block of metal 25 of the shaft end is available for the formation of fittings. It is recognized that in the past, in connection with the various other forms of expedients used to prevent unraveling, it was attempted to shape the ends, as by swaging, into "squared" ends, to establish the driving relation desired. It was found in actual practice, however, that owing to various disadvantages of the terminals and of the shapes used, it was in most every case necessary to reinforce the squaring of the end by inserting the shaped end into the sleeved end of a driving fitting, which was then swaged for a considerable length and forced into constricted relation about the squared end of the shaft, so as to both help to prevent unraveling by affording shaft end reinforcement and also to furnish the driving torque-transmitting agency that the prior art shaft ends alone were not strong enough to furnish.

Figure 7:
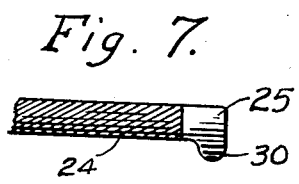
Fig. 7 represents a fragmentary elevation of a shafting having a form of terminal fitting that may be formed by the very process of melting the shaft apart, by providing a dependent eccentric portion which may itself comprise the driving fitting.
Figure 8:
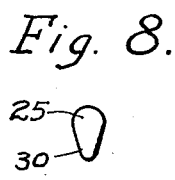
Fig. 8 represents an end elevation of the same.

The invention shown in Figs. 7 and 8 contemplates that by suitably disposed electrodes, and by suitably proportioning the strength of melting or fusing current, it is possible to cause the melted block of metal to contain a little more metal than in the form shown in Figures 3 and 4, whereby the melted metal is gravitationally affected so that a "tear drop" of a slightly eccentric concentration of fused metal, as 30, is provided, which can be produced predeterminedly. If desired this may be subjected to grinding on one or more sides.

In Figure 9, the end 25 has been ground off to form the short bladed end 35, of the same width as the diameter of the shaft 24. A female fitting can be produced as shown in Fig. 10, in that the fused block 25 can be ground and slotted to form the slot 36, which may be made of the size to receive the tongue of blade 35 of Figure 9.

Reference is made to Figs. 11 and 12 for an important modification. In Fig. 11, a lower electrode 51 is shaped to receive the lower portion of shaft 18, and has a cooperating upper relatively movable electrode 52 arranged to be constricted upon the upper surface of the shaft 18, and also upon a part of the separate and independent key or spline 53 extending longitudinally of the shaft 18 and also engaged by the upper electrode 54 of the other relatively adjustable pair of electrodes 54 and 55. Obviously the spline 53 should, under normal circumstances, be of substantially the same resistance as the flexible shafting, so that its heating and fusion will be at the same rate as the shafting. The spaced electrodes just described are disposed in the same sort of electric circuit as that already described, so that when desired the current is caused to flow longitudinally of both the shafting and the spline or key. If the resistance factor of both has been carefully predetermined, and if the electrical bond between spline and shaft is properly intimate, as by proper pressure and clean surfaces, the shaft and spline will melt together to weld the spline and shaft as an integral unit, and the unit will simultaneously melt apart as shown in Fig. 12. Thus the sole act of passing the current will melt the shaft apart, will fuse the terminal ends thereof to anchor and secure all of the strands to the fused block, and also will form an integral eccentric abutment or driving connection of the male order for the shaft. While the spline 53 is shown as having its ends remote from the fused shaft terminals as merely engaging the side surface of the shaft, it will be understood that the spline and electrodes can be so proportioned as to have it secured and welded to the fused block portion throughout its length.

In Figures 13 and 14 there is shown another form of apparatus for severing flexible shafting. Two pairs of jaws are shown at 61, 62, and 63, 64. Each pair of jaws is pivoted as indicated at 65 to permit raising and lowering of the front portion of the jaws in order to insert the shafting 18 in position between the electrodes 66—66.

The electrodes as shown in Figures 13 and 14 are generally similar to those shown in Figure 1 with the exception that the flutings or grooves such as indicated at 67 and 68 are of different sizes. Thus by merely rotating the electrodes to different positions shafting of different dimensions may be accommodated in the apparatus.

The lower jaws 62, 64 of each pair are fastened to a base or table 69 composed of insulating material. Bolts 70 are used for clamping the jaw members in position on the base 69. In order to provide for adjustment to permit varying the spacing of the two pairs of jaws for the purpose of changing the length of shafting through which the electrical current passes, the holes 71 and 72 in the flanges 73 and 74 are elongated as indicated at 71 and 72 in Figure 14. Adjustment of the spacing between the two pairs of electrodes to an extent sufficient to take care of most variations required in the length of shafting through which the electrical current passes can also be accomplished by moving the electrodes 66—66 in their supporting jaws in a horizontal direction parallel to their axes of rotation.

The jaws are normally held in open position as indicated in Figure 13 by dotted outline 61a by means of a spring 75. Pressure may be applied to the jaws by a pneumatic device, the outer casing of which is shown at 76. Member 77 slides in casing 76 and is connected with the piston which applies pressure to member 77. The clamping pressure is transmitted to the jaws 61 and 63 through a block 78 composed of insulating material.

Pneumatic control of the clamping disc may be arranged for operation from a foot pedal 79, thus leaving the operator's hands free to adjust and hold the shafting in position until the clamping pressure is applied. Pedal 79 is shown in full lines in the depressed position, in which position the electrodes have been forced to clamping engagement with the shafting. Pedal 79 is attached to a lever 80 interconnected by a rod 81 to a short lever arm 82 attached to a valve 83 which controls the admission of pressure to the cylinder enclosed in casing 76. Pipes 84 and 85 convey the compressed air used for operating the clamping mechanism. A spring 86 attached to the lever 80 normally retains the pedal 79 and the lever 80 in released position indicated by dotted outline 79a and 80a except when the pedal is held in depressed position by the operator. When in the released position, the valve lever 82 will be in position 82a in which the air supply is shut off from the cylinder and the pressure released to allow the spring 75 to urge the upper clamping jaws into the open position 61a.

The electrical current to be passed through the shafting 18 for the purpose of severing it is supplied to the clamping jaws from electrical leads 87 and 88. Lead 87 is divided into the two parts 87a and 87b which are connected to jaws 61 and 62 respectively and lead 88 is similarly connected to jaws 63 and 64 by its branches 88a and 88b. By connecting the upper and lower jaws independently to their main leads it is assured that the current will flow between the shafting and both the upper and lower electrodes without the possibility of having a major portion of the current flow through only one of the electrodes as might occur if the leads were attached to only one jaw, in which case it would be necessary for the current to pass to the other jaw through the pivot 65. In certain instances a good connection might not be obtained through pivot 65 due to a lubrication film or other cause which might result in faulty operation of the apparatus. The use of the double connection 87a and 87b eliminates possible trouble from this source.

It should be noted that since each pair of clamping jaws is insulated from the other by means of the insulating material 69 of the table and the insulating blocks 78, the current must flow through the short length of shafting 18 between the electrodes.

The electrical current is supplied to leads 87 and 88 from the low voltage side of a transformer 89. Leads 90 and 91 supply the high voltage current to the transformer. In the lead 91, a switch 92 which may be of the toggle type is used to complete the electrical circuit at the desired time. A device for actuating the switch 92 is enclosed in a cylinder indicated at 93, which device is interconnected with the control mechanism for actuating the clamping pressure to the electrodes. A small arm 94 is clamped to the control rod 81, preferably in a fashion to permit adjustment of its position thereon.

The construction and operation of the switch operating device can best be understood by reference to Figure 15. Upon movement of the clamping control mechanism to the position shown by solid lines, the arm 94 moves to its lower solid line position. In this position the spring 95 located inside the cylinder 93 is free to urge the piston 96 downwardly to move the toggle lever 97 of the switch 92 to its "on" position indicated by dotted outline at 97a, the piston 96 being interconnected with the lever 97 by means of a rod 98 having a ring or slot 99 at its outer end to engage the lever 97. In the space 100 in the cylinder 93 below the piston 96 is a quantity of fluid, preferably an oil which is little affected by changes in temperature. A rod 101 is attached to the piston 96 by means of a thread 102. The rod 101 passes through an opening in the top cover 103 and has a projection 104 at its upper end to cooperate with arm 94 to control the operation of the switch actuating device.

When the piston 96 is released so that it is urged downwardly under the action of spring 95, the fluid in the chamber 100 must pass upwardly through the holes 105 and 106 to the upper side of the piston. By this means the switch lever 97 is not moved to "on" position until a brief interval after the projection 104 has been released. The length of time is governed by the rate of flow of the fluid through the channel 105. This rate of flow may be varied by adjusting the pointed end 107 of the rod 101 to change the amount of restriction at the opening of hole 105. This adjustment is accomplished by turning rod 101 on its screw thread 102. In this way the interval between the time when the arm 94 moves to the full line position and thereby releases rod 101 and the time when the switch lever 97 is moved to "on" position, may be adjusted to suit the requirements of the particular work being done. It should be noted that in the full line positions of the parts in Figures 13 and 15 the clamping pressure has just been applied to retain the flexible shafting and the apparatus is in condition to receive the current which will complete the severing operation. The slight delay in completing the electrical circuit by means of a device shown at 93 is necessary in order to prevent the possibility of the current being applied to the shafting before the clamping action has been completed in which case improper operation of the cutting device would occur with the possibility of unraveling of some of the strands of the shafting.

Upon release of the foot pedal 79 it moves to dotted position 79a under the influence of spring 86 and carries with it the arm 94 to dotted position 94a. Upon this upward movement of the arm 94, the rod 101 and thus piston 96, is also carried back to its upper position since the arm 94 engages with the projection 104 on its upward movement. The switch lever 97 is thereby returned to its "off" position ready for the next operation. The upward movement of the piston is not restricted by the hydraulic action of the fluid since a check valve 108 is provided in the piston 96 so that passage of oil from the upper chamber to the lower chamber 100 is substantially unrestricted.

It will be evident that by the foregoing system for controlling the clamping action and the electrical circuit, automatic and reliable means for assuring the proper sequence of operations with no loss of time is provided. It should be pointed out that the delay in completing the circuit after the clamping pressure has been applied may be only a matter of a fraction of a second but this delay is accurately adjustable to the desired amount. It should also be noted that at all times both hands of the operator are free to adjust and hold the flexible shafting so that a minimum of time is required between operations.

The operation of the apparatus will then be as follows—The operator moves the shafting to the position at which it is desired to make the separation and holds it while moving the foot pedal 79 to the clamping position. The action of moving the foot pedal brings the upper jaws and electrodes into clamping engagement with the shafting and the current is then applied without the necessity for the operator removing his hands. Upon the completion of the separating, the operator merely removes pressure from pedal 79 which releases the clamping jaws and the apparatus is ready for the next cycle.

In Figure 16 is shown another method of retaining the adjustable electrodes 109—109 in their supporting members 110—111. Each electrode supporting member as 110 has a separate front portion as indicated at 110a. The connection is preferably made forwardly of the center of the electrode 109 and a bolt 112 is provided for attaching part 110a and applying a pressure to retain the electrode 109 firmly in position. When adjustment to a new groove is desired bolt 112 is loosened sufficiently to permit the electrode 109 to be rotated.

In certain types of production work this mounting for the electrodes is preferred over that shown in Figures 1 and 13 where proper fit is relied upon to retain them in position. It is essential that the grooves which clamp the shaft in position be maintained in correct alignment so that the severed shaft ends will have no distortion which would be objectionable in a rotating shaft.

It will be evident from the foregoing description that my improved apparatus is adapted to sever stranded shafting and prevent unraveling or fraying of the ends by simple and economic means. The use of my electrode having multiple depressions which may be quickly adjusted to a new position, will produce a considerable saving in cost since a single electrode may be used in several positions and no appreciable time is lost in shifting the electrode position to compensate for wear. In addition my improved type of electrode is readily adaptable to meet various conditions as regards sizes and shapes of parts being separated. The use of the retarded contactor permits a saving in time and effort on the part of the operator it being pointed out that the act of clamping the shafting between the electrode causes the current to be passed through it at the proper time to assure satisfactory severance.

I claim:

1. Apparatus for severing flexible shafting, including a pair of clamping jaws, an aperture in each jaw in opposed position to the aperture in the co-operating jaw, each aperture having an opening on the internal face of the jaw which has a smaller width than the width of the aperture at a point spaced from said face, a metal electrode element shaped to fit said aperture and having a plurality of flutings of generally semi-circular shape for the purpose of clamping the shafting and transmitting electrical energy thereto.

2. Apparatus for severing flexible shafting including a pair of metal clamping members, an aperture in each of said members in opposed position to the aperture in the cooperating member, said apertures having an opening on the inside face of the member, the opening being of less width than the width of the aperture at a point spaced from said face of the member, a metal electrode element shaped to be retained in each of said apertures and removable therefrom only in a direction substantially perpendicular to the direction of the clamping movement between said members.

3. Apparatus for severing flexible shafting including a pair of metal clamping members, an aperture in each of said members in opposed position to the aperture in the cooperating member, said apertures having an opening on the inside face of the member, the opening being of less width than the width of the aperture at a point spaced from said face of the member, a metal electrode element shaped to be retained in each of said apertures and removable therefrom only in a direction substantially perpendicular to the direction of the clamping movement between said members and a plurality of grooves in said electrode element shaped to accommodate the shafting to be severed.

4. Apparatus for clamping flexible shafting and passing an electric current therethrough including a pair of metal clamping members, an aperture in at least one of said members, said aperture having a cross sectional shape greater than a semi-circle, and a metal electrode element of generally circular section and having a plurality of grooves insertable in said aperture.

5. Apparatus for clamping flexible shafting and passing an electric current therethrough including a pair of metal clamping members, an aperture in at least one of said members, said aperture having a cross sectional shape greater than a semi-circle, a metal electrode element having a generally circular section insertable in said aperture only in a direction substantially perpendicular to the direction of the clamping movement between said clamping members.

6. Apparatus for clamping flexible shafting and passing an electric current therethrough including a pair of metal clamping members, an aperture in at least one of said members, said aperture having a cross sectional shape greater than a semi-circle, a metal electrode element of generally circular section insertable in said aperture only in a direction substantially perpendicular to the direction of the clamping movement between said clamping members, said electrode further having a plurality of grooves and being capable of rotation in said aperture for the purpose of positioning alternative grooves for clamping.

7. Apparatus for clamping flexible shafting and passing an electric current therethrough including two pairs of metal clamping jaws, an aperture in at least one of the jaws of each pair, each aperture having an opening on the inside face of the jaw, the opening being of less width than the width of the aperture at a point spaced from said face of the jaw, and a metal electrode shaped to be retained in each of said apertures and project beyond said opening.

8. Apparatus for clamping flexible shafting and passing an electric current therethrough including two pairs of metal clamping jaws, an aperture in at least one of the jaws of each pair, each aperture having an opening on the inside face of the jaw, the opening being of less width than the width of the aperture at a point spaced from said face of the jaw, and a metal electrode shaped to be retained in each of said apertures and project beyond said opening, said electrodes having a plurality of grooves and being adjustable without removal from said aperture whereby alternative grooves may be used for clamping.

9. In apparatus for severing lengths of flexible shafting, a support, opposed pairs of fluted electrodes mounted in the support, means for forcing the electrodes of each pair toward each other to embrace a flexible shaft in the respective flutings, means for impressing an electric current on the electrodes to cause flow of energy longitudinally of such shaft, and means for adjusting said fluted electrodes to move different flutings into position for embracing a shaft during severing.

10. apparatus for severing flexible shafting by passing an electrical current through a short portion of the shafting including two pairs of clamping jaws, an electrode element supported in at least one jaw of each of said pairs of clamping jaws, said electrode element having a plurality of grooves configured to fit the shafting to be severed and clamp it securely during the severing operation and means supporting said electrode elements in said jaws for movement to permit adjustment with respect thereto.

11. Apparatus for severing flexible shafting by passing an electrical current through a short portion of the shafting including two pairs of clamping jaws, an electrode supported in at least one jaw of each of said pairs of clamping jaws, said electrode having a plurality of grooves of different sizes to suit different sizes of shafting and clamp such shafting securely during the severing operation and means supporting said electrode in said jaws for movement to permit selective positioning of said grooves.

12. Apparatus for severing flexible shafting by passing an electrical current through a short portion of the shafting including two pairs of clamping jaws, an adjustable clamping electrode having a plurality of clamping grooves supported in at least one jaw of each of said pairs of clamping jaws and means for supporting said electrodes in said jaws for movement relative thereto for adjustment purposes.

13. Apparatus for severing flexible shafting by passing an electrical current through a short portion of the shafting including two pairs of clamping jaws, an electrode element supported in each of the jaws of at least one of said pairs of clamping jaws, means for supporting said electrodes in said clamping jaws for movement in a direction to change the gap between the electrodes in one of said pairs of clamping jaws and the other pair of clamping jaws.

14. Apparatus for severing flexible shafting by passing an electrical current through a short portion of the shafting including two pairs of clamping jaws, an electrode element supported in each of the jaws of at least one of said pairs of clamping jaws, means for supporting said electrodes in said clamping jaws for rotational adjustment about an axis and also for adjustment in a direction parallel to said axis.

LEWIS F. HAHN.